(12) United States Patent
Isakovich

(10) Patent No.: US 9,268,501 B1
(45) Date of Patent: Feb. 23, 2016

(54) HIGH PERFORMANCE SOLID-STATE BASED COMPUTER DATA STORAGE ARRAY

(75) Inventor: Thomas Z. Isakovich, San Francisco, CA (US)

(73) Assignee: Nimbus Data Systems, Inc., South San Francisco, CA (US)

( * ) Notice: Subject to any disclaimer, the term of this patent is extended or adjusted under 35 U.S.C. 154(b) by 500 days.

(21) Appl. No.: 13/565,701

(22) Filed: Aug. 2, 2012

(51) Int. Cl.
*G06F 12/00* (2006.01)
*G06F 3/06* (2006.01)

(52) U.S. Cl.
CPC ............... *G06F 3/0689* (2013.01); *G06F 3/06* (2013.01); *G06F 3/0605* (2013.01); *G06F 3/0646* (2013.01); *G06F 3/0653* (2013.01); *G06F 3/0668* (2013.01); *G06F 3/0683* (2013.01)

(58) Field of Classification Search
None
See application file for complete search history.

(56) References Cited

U.S. PATENT DOCUMENTS 8,918,571 B2 * 12/2014 Myrah et al. .................. 710/300
2012/0246403 A1 * 9/2012 McHale et al. ............... 711/114

* cited by examiner

*Primary Examiner* — Midys Rojas
(74) *Attorney, Agent, or Firm* — Charles Shemwell

(57) ABSTRACT

A high performance computer data storage array stores data across a plurality of disk drives. The disk drives may be solid-state drives (SSDs). The storage array may utilize the Serial Attached Small Computer Systems Interface (SAS) protocol, meaning that the disk drives may have high data throughput capabilities. Circuitry within the storage array may leverage the individual capabilities of the high-performance SAS SSDs to increase the overall performance of the storage array. The storage array can function as a network-attached system and/or as a component of a storage area network.

9 Claims, 5 Drawing Sheets

US 9,268,501 B1

HIGH PERFORMANCE SOLID-STATE BASED COMPUTER DATA STORAGE ARRAY

BACKGROUND

1. Field

The present disclosure relates generally to computer data storage arrays, and more specifically to computer data storage arrays with solid-state drives (SSDs).

2. Description of Related Art

The term "storage array" describes a computer data storage system that comprises multiple disk drives. A storage array stores data across multiple disk drives in order to provide scalability (e.g., higher capacity) and improved error recovery as compared with single disk drive storage devices.

Some storage arrays are designed to be attached directly to a host computer. For example, a SCSI-based "direct-attach" storage array is attached directly, via cables, to a Small Computer Systems Interface (SCSI) host controller of a host computer. Some storage arrays are designed to couple indirectly, via a network, with host computers. For example, a network-attached storage (NAS) array is coupled to a network and provides data storage capabilities, over the network, to other network nodes.

FIG. 1 illustrates exemplary NAS storage array 100. As shown, NAS storage array 100 is coupled to network 199. Network nodes 101-103, which are computer terminals or other suitable computing devices, are also coupled (via wires or wirelessly) to network 199. Network nodes 101-103 can access NAS storage array 100 over network 199, meaning that network nodes 101-103 can read from and/or write to file system volumes that are provided by NAS storage array 100.

BRIEF SUMMARY

In some embodiments, a computer data storage array receives file input/output (I/O) requests via a network. A processor of the storage array converts the file I/O requests into interface-specific I/O instructions. The processor routes the interface-specific I/O instructions to one or more I/O controllers. The routing of interface-specific I/O instructions may be based on an algorithm that load balances between multiple I/O controllers. The routing may occur over SAS signal paths that support link aggregation. The I/O controller relays the interface-specific I/O instructions to one or more disk drives that are coupled to the I/O controller so that the interface-specific I/O instruction can be carried out by the disk drive.

In some embodiments, the interface-specific I/O instructions are Serial Attached Small Computer Systems Interface (SAS) instructions. In some embodiments, the disk drives are magnetic disk drives. In some embodiments, the disk drives are SAS solid-state drives (SSDs). In some embodiments, the computer data storage array is a network-attached storage array. In some embodiments, the computer data storage array is part of a storage area network. In some embodiments, the computer data storage array is attached via fiber optics to a host computer. In some embodiments, the computer data storage array is attached via an Infiniband connection to a host computer.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
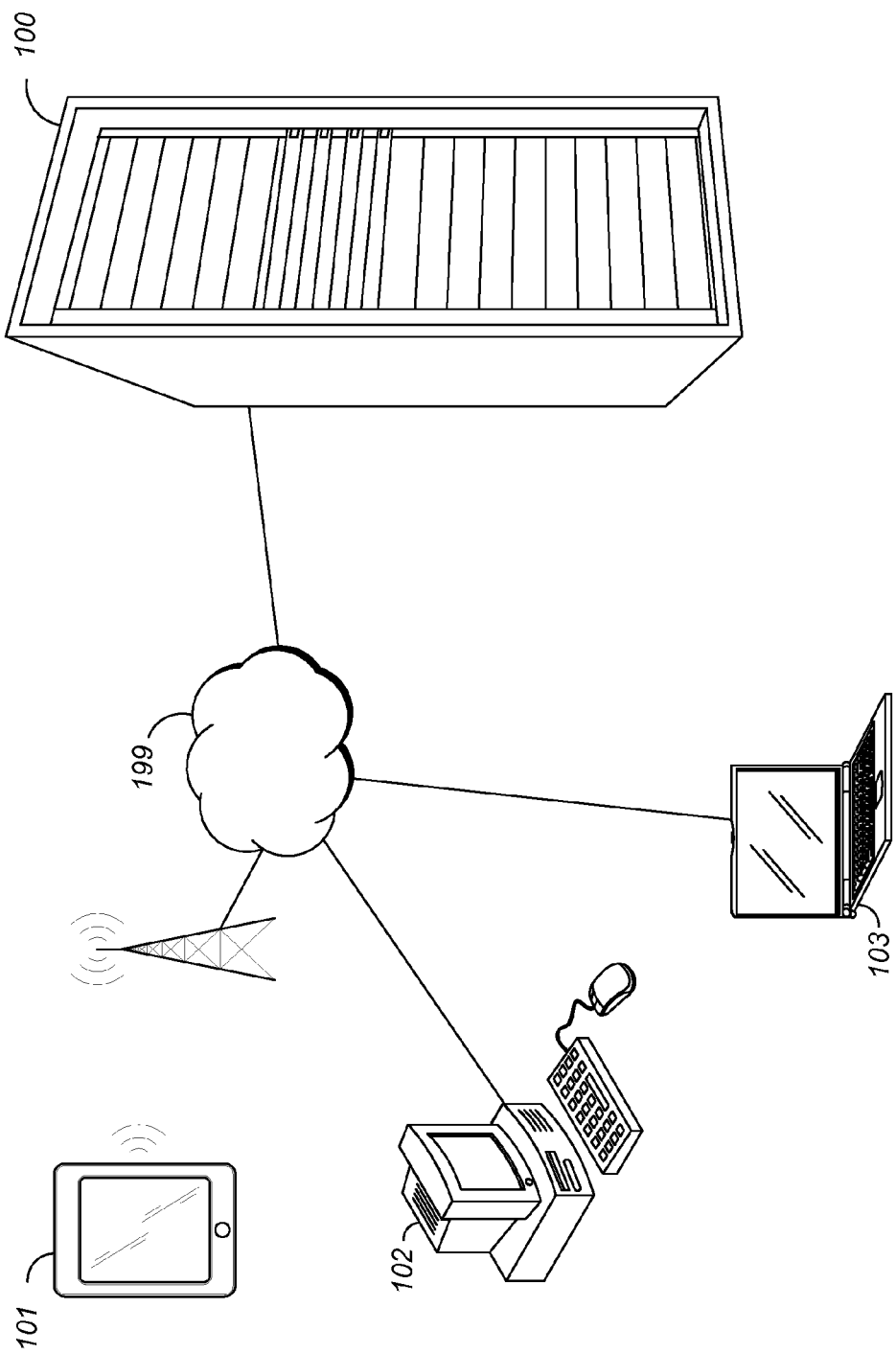
FIG. 1 is a block diagram depicting a network including an exemplary network-attached storage array.
Figure 2:
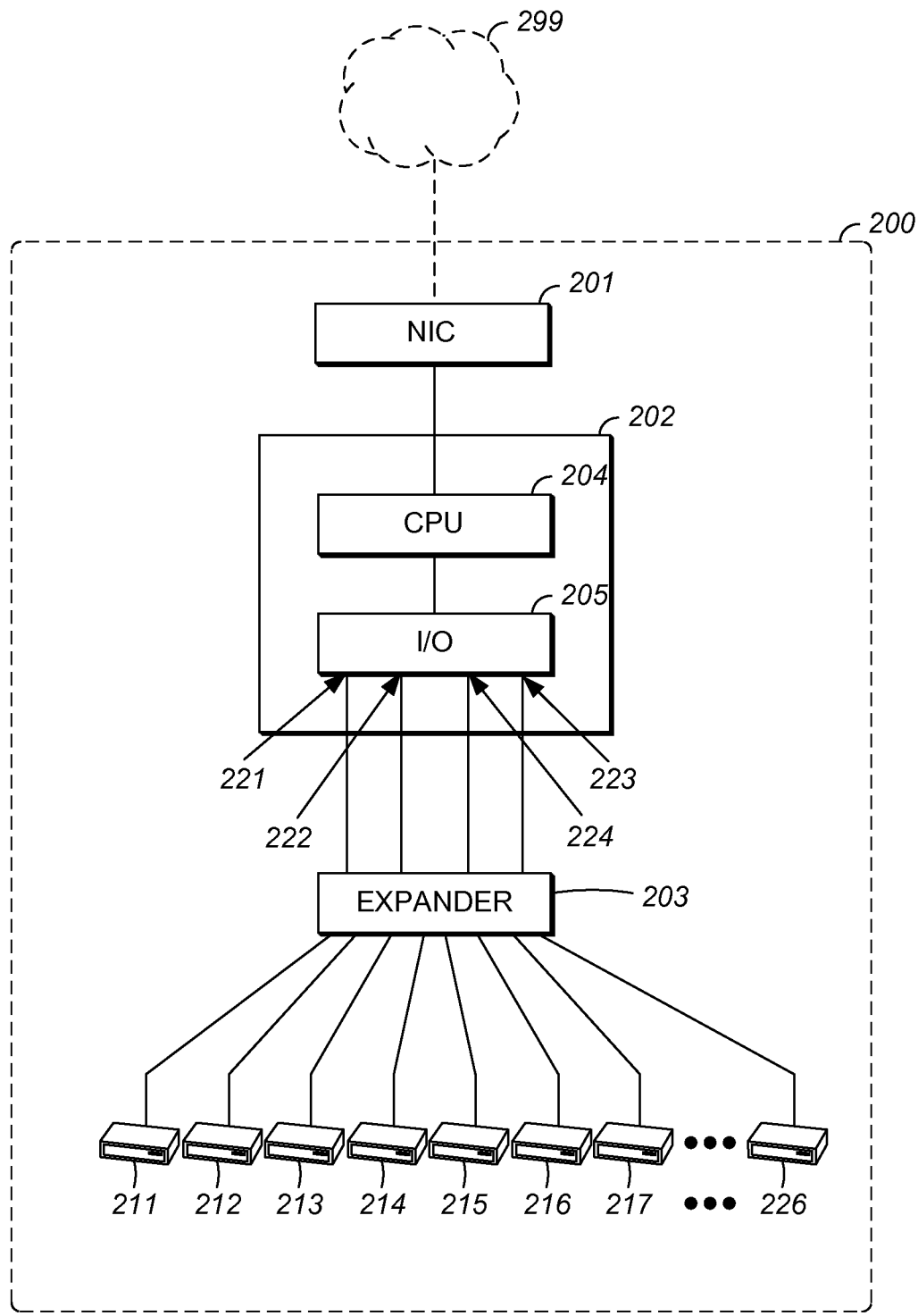
FIG. 2 depicts an exemplary network-attached storage array.

FIG. 2 illustrates an exemplary NAS storage array 200 with magnetic disk drives. Exemplary NAS storage array 200 includes network interface 201, controller 202, expander 203, and magnetic disk drives 211-226. Network interface 201 is adapted to be coupled to a network (e.g., network 299) and to receive incoming file input/output ("I/O") requests from nodes of the network. Network interface 201 communicates with network nodes via one or more networking protocols, for example, the Ethernet network protocol.

Incoming file I/O requests are passed from network interface 201 to controller 202. Controller 202 includes processor 204 for translating incoming file I/O requests into interface-specific I/O instructions, and I/O unit 205 for communicating with downstream components of NAS storage array 200 that are needed to fulfill the interface-specific I/O instructions. NAS storage array 200 may use interface-specific I/O instructions such as those defined by the Serial Attached Small Computer Systems Interface (SAS) protocol. Expander 203 relays interface-specific I/O instructions from controller 202 to one or more of magnetic disk drives 211-226 as necessary for performing I/O operations.

As shown in FIG. 2, I/O unit 205 of controller 202 includes four physical communication ports 221-224 to which downstream components can be coupled. Although not shown, it is thus possible to couple up to four of magnetic disk drives 211-226 to controller 202 directly, using suitable signal paths (e.g., cables). However, if ports 211-224 are each coupled directly to a magnetic disk drive, then the total capacity and performance of NAS storage array 200 would be limited to the collective capabilities of only four magnetic disk drives, as opposed to that of 16 disk drives as shown in FIG. 2

In such a configuration, the performance capabilities of controller 202 would be underutilized because typical controllers (e.g., controller 202) are designed to support more than the number of magnetic disk drives that can be coupled directly to the controller. Consider, for example, a design in which controller 202 is a Serial Attached Small Computer Systems Interface (SAS) controller, and that each of ports 221-224 supports a maximum data throughput of up to 6 gigabits per second ("Gb/s"). In this design, to fully utilize the performance capabilities of controller 202, each of ports 221-224 should be coupled with a component that is capable of transmitting data at 6 Gb/s, such that the performance capability of each of ports 221-224 is more fully utilized. A magnetic disk drive of SAS design, however, provides only up to 1.5 Gb/s of maximum data throughput. Thus, the capabilities of controller 202 would only be 25% utilized (i.e., only 1.5 Gb/s out of a maximum of 6 Gb/s would be used) if ports 221-224 of controller 202 are each coupled directly to a SAS magnetic disk drive.

To more fully utilize the performance capabilities of controller 202, an expander 203 is used to increase the number of magnetic disk drives that are coupled, indirectly, to controller 202. As shown in FIG. 2, expander 203 indirectly couples 16 magnetic disk drives 211-226 to controller 202 while using the same ports 221-224. The performance capabilities of ports 221-224 (i.e., 24 Gb/s) are more fully utilized by 16 magnetic disk drives that, collectively, can provide up to 24 Gb/s of data throughput.

Expander 203 is useful within the topology of NAS storage array 200 because the performance capabilities of controller 202 are over engineered as compared to the performance capabilities of each of magnetic disk drives 211-226. In this way, the function of expander 203 is similar to that of a network switch, which allows multiple network nodes to be coupled to a fewer number of network ports to more fully leverage the bandwidth that is available from the network ports.

Recently, solid-state drives (SSDs), which provide better performance than magnetic disk drives, are used as high performance alternatives to magnetic disk drives. Some SAS SSDs can provide up to 6 Gb/s of data throughput, which equates to four times the performance of a SAS magnetic disk drive.

Figure 3:
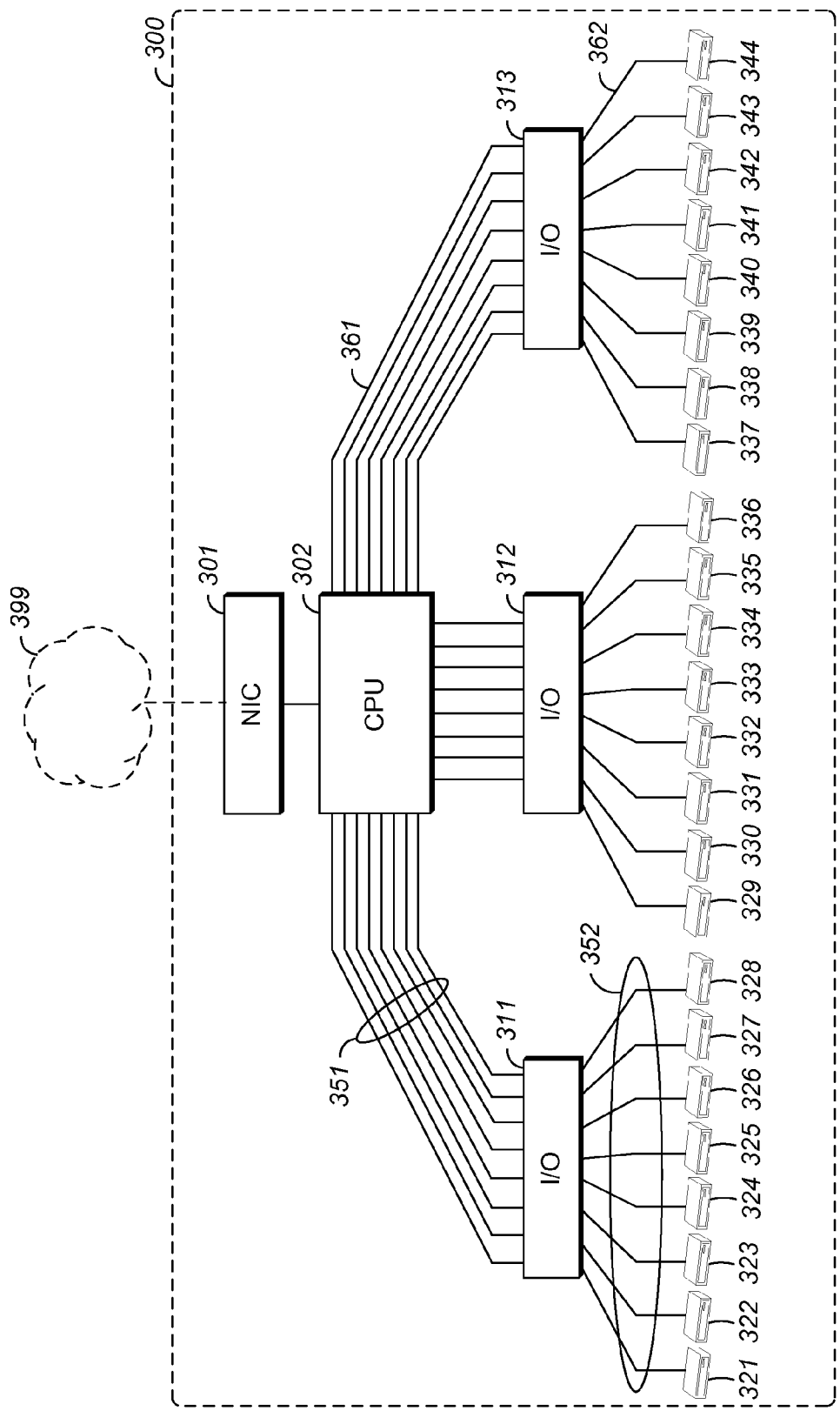
FIG. 3 depicts another exemplary network-attached storage array.

FIG. 3 illustrates an exemplary embodiment of a NAS storage array with solid-state drives (SSDs). Exemplary NAS storage array 300 includes network interface 301, processor 302, I/O controllers 311-313, and SSDs 321-344. Network interface 301 is adapted to be coupled to a network (e.g., network 399) and to receive incoming file I/O requests from nodes of the network. Network interface 301 communicates with network nodes via one or more networking protocols, for example, the Ethernet network protocol.

Network interface 301 is coupled to processor 302 and passes incoming file I/O requests to processor 302. Processor 302 performs at least two functions after receiving a file I/O request. First, processor 302 translates a received file I/O request into one or more interface-specific I/O instructions that are understood by SSDs 321-344. Second, processor 302 routes the interface-specific I/O instructions to one or more downstream devices so that the inter-specific I/O instructions can reach one or more of SSDs 321-344. These functions of processor 302 are further discussed below.

Consistent with the plain and ordinary meanings of the terms, "a file I/O request" differs from an "interface-specific I/O instruction" in that a file I/O request is typically defined by the file system (of an operating system) that is being used, and that a file I/O request typically provides computer instructions with respect to a computer file. For example, a file I/O request may include an identifier that represents a file (e.g., a pointer), a location within the file, and an operation to be performed against the particular location of the file (e.g., read and/or write). File systems such as NFS define file I/O requests. In contrast, an interface-specific I/O instruction is typically defined by the hardware interface standard that is supported by a physical disk drive. An interface-specific I/O instruction instructs the circuitry of a disk drive to carry out certain operations. For example, the SAS protocol defines a set of hardware instructions that SAS-compliant disk drives are to understand.

In addition to translating file I/O requests to interface-specific I/O instructions, processor 302 also identifies one or more disk drives for carrying out the interface-specific I/O instructions so that the corresponding file I/O request can be fulfilled. An identified disk drive may be a disk drive that contains a computer file that has been requested via the corresponding file I/O request. Processor 302 routes the interface-specific I/O instruction to an appropriate I/O controller so that the interface-specific I/O instruction can be relayed by the I/O controller to the identified SSDs. For this purpose, processor 302 of exemplary NAS storage array 300 is coupled to I/O controllers 311-313, as shown in FIG. 3.

As an example, processor 302 may translate a file I/O request into interface-specific I/O instructions that are to be carried out by exemplary disk drive 321. In this example, processor 302 would route the interface-specific I/O instructions via I/O controller 311 to disk drive 321 because disk drive 321 is coupled to I/O controller 311.

It is possible for processor 302 to translate a file I/O request into multiple interface-specific I/O instructions that are to be routed to multiple disk drives via multiple I/O controllers. For example, the contents of a computer file may span across multiple locations on a disk (e.g., as a result of interleaving) and/or multiple disk drives (e.g., as a result of the use of a Redundant Array of Independent Disks).

It is also possible for processor 302 to load balance file I/O requests so that their corresponding interface-specific I/O instructions are routed across multiple I/O controllers and/or multiple disk drives in a parallel fashion, thereby allowing the corresponding interface-specific I/O instructions (and the resulting data transmissions) to be distributed across multiple I/O controllers and/or multiple disk drives in order to improve performance. The load balancing may be based on an algorithm that attempts to equalize the work load of multiple I/O controllers and/or multiple SSDs.

Consider, for example, the load balancing of two file I/O requests across two multiple disk drives. If the corresponding interface-specific I/O instructions are performed by two disk drives in parallel fashion, the aggregate maximum data throughput would be twice that of the maximum data throughput of a single disk drive. Also consider, for example, the load balancing of two file I/O requests across two I/O controllers (and, as a result, two disk drives). To the extent that the circuitry of an I/O controller introduces latency to NAS storage array 300, such latency would be reduced because the latency would be experienced by the two I/O controllers in parallel, not in series.

I/O controllers 311-313 are each coupled via interface-specific physical ports (e.g., "phy" ports) and signal paths (e.g., cables) of suitable design and length to processor 302. These signal paths can be referred to as "linkages" and/or "links." Processor 302 and I/O controllers 311-313 may support the use of the SAS protocol. As such, processor 302 and I/O controllers 311-313 (and disk drives 321-344) may each include SAS ports. Since each SAS port supports a maximum data throughput of 6 gigabits per second (Gb/s), the ports of processor 302 and I/O controllers 311-313 may each support a maximum data throughput of 6 Gb/s.

The ports of processor 302 and I/O controllers 311-313 also support link aggregation, meaning that the ports can combine, in parallel, to provide a maximum data throughput that exceeds the maximum data throughput of a single port. As shown in FIG. 3, I/O controller 311 is coupled to processor 302 by connecting eight ports on each device using links 351. When the SAS protocol is utilized, the maximum data throughput between processor 302 and I/O controller 311 is eight times the maximum data throughput of a single (SAS) port, for a total of 48 Gb/s. For the same reason, the maximum data throughput between processor 302 and I/O controllers 311 and 312 can also each be rated at 48 Gb/s.

I/O controllers 311-313 are coupled with SSDs 321-344. Specifically, as shown in FIG. 3, I/O controller 311 is coupled with SSDs 321-328, I/O controller 312 is coupled with SSDs 329-336, and I/O controller 313 is coupled with SSDs 337-344. SSDs 321-344 may support the use of the SAS protocol. Similar to the physical ports discussed above, a SAS SSD also supports a maximum throughput of 6 Gb/s. As such, when the SAS protocol is utilized, the maximum data throughput between an I/O controller and a disk drive, such as between I/O controller 311 and disk drive 321, is also 6 Gb/s. Since I/O controller 311 controls eight disk drives 321-328, the maximum data throughput that can be produced via I/O controller 311 is eight times the maximum data throughput of a (SAS) SSD, for a total of 48 Gb/s.

Notably, in NAS storage array 300, the maximum bandwidth between processor 302 and an I/O controller (e.g., I/O controller 311), and the maximum bandwidth between the I/O controller (i.e., I/O controller 311) and its downstream SSDs is identical. Thus, the links between processor 302, I/O controllers 311-313, and disk drives 321-344 do not impose bottlenecks to maximum data throughput, even if each disk drive in the NAS storage array operates at its maximum throughput simultaneously.

Put another way, in NAS storage array 300, the bandwidth between processor 302 and its downstream I/O controllers is not oversubscribed by downstream SSDs 321-344. Oversubscription of data bandwidth between processor 302 and an I/O controller is avoided by maintaining, to the extent possible, a 1-to-1 ratio between the capability of links that couple an I/O controller (e.g., I/O controller 311) with processor 302, and the capability of disk drives that are coupled to the I/O controller (i.e., I/O controller 311). As shown in FIG. 3, the maximum data throughput of the links 351 between processor 302 and I/O controller 311, and the maximum data throughput of links 352 between I/O controller 311 and its downstream disk drives 321-328 are the same (e.g., 48 Gb/s when the SAS protocol is used). As such, the relevant (aggregate) ratio is maintained at 1-to-1.

Further, it is possible for a link from processor 302 to an I/O controller and a link from the I/O controller to a downstream SSD to have a 1-to-1 ratio in terms of maximum data throughput. In this way, the two links can form a "lane" for data traffic between processor 302 and the downstream disk drive. As shown in FIG. 3, the maximum data throughput of link 361 and link 362 are the same (e.g., 6 Gb/s when the SAS protocol is used). As such, the relevant (individual) ratio is also maintained at 1-to-1.

By way of the above-described techniques, each of the eight SSDs 321-328 that are coupled with I/O controller 311 can simultaneously transmit computer data at its maximum data throughput without oversubscribing the capability of links 351 between I/O controller 311 and processor 302. Since NAS storage 300 of the present exemplary embodiment includes three I/O controllers 311-313 and each port can sustain a maximum throughput of 6 Gb/s (when the SAS protocol is used), NAS storage array 300 can be capable of a maximum overall data throughput of 144 Gb/s when I/O controllers 311-313 are fully utilized.

NAS storage array 300 does not rely on the use of expanders. The use of an expander between an I/O controller (e.g., I/O controller 311) and a SSD (e.g., SSD 321) in NAS storage array 300 would be counterproductive for at least two reasons. First, the expander would increase the latency of NAS storage array 300 because the expander would lengthen the signal path within NAS storage array 300. As one of ordinary skill in the art would appreciate, latency increases the response time of an electronic device, and is generally undesirable for high-performance electronic devices. Second, the expander would cause oversubscription of data bandwidth between processor 302 and an I/O controller, because the expander would allow additional SSDs to be coupled with the I/O controller without increasing the capability of the links between the I/O controller and processor 302. As such, the ratio of maximum data throughput between processor 302 and the I/O controller, against the maximum data throughput of the I/O controller's downstream disk drives, would not be maintained at 1-to-1.

It should also be noted that while the stated maximum throughput of the SAS protocol is 6 Gb/s, the actual maximum data throughput of a device that is of SAS design may vary. That is, a device of SAS design that has a maximum throughput of close to, but not quite 6 Gb/s, would still function within an SAS topology. Put another way, such a device would be SAS-compatible, if not entirely SAS-compliant. As an example, one of ordinary skill in the art would appreciate that a SSD that supports a maximum throughput of 5,999,999,999 bits per second (i.e., 5.99 Gb/s without rounding) would still function within an SAS topology, and that the missing bit of information could be addressed using error recovery and bandwidth throttling techniques. Thus, for purposes of this disclosure, a storage array component that is designed to inter-operate with other devices of the SAS protocol, but does not reach the maximum throughput of 6 Gb/s should be understood to be a SAS component that, effectively, has a maximum throughput of "about 6 Gb/s."

It should also be noted that, although the foregoing description states the maximum data throughput of the SAS protocol as 6 Gb/s, the actual maximum throughput of the SAS protocol is likely to exceed 6 Gb/s in the future. Indeed, the transmission of data at 12 Gb/s using the SAS protocol is possible. Thus, this disclosure is not limited to interface-specific protocols that have a maximum data throughput of (about) 6 Gb/s; rather, the above-described techniques can be implemented using interface-specific protocols that have even higher performance. For example, the use of SAS-compliant devices that achieve 12 Gb/s of data throughput according to the design of NAS storage array 300 (FIG. 3) would produce a NAS storage array capable of 288 Gb/s in maximum data throughput. Further, this disclosure is also not limited to devices that utilize the SAS protocol. Other suitable, non-SAS protocols can be incorporated into the design of NAS storage array 300 (FIG. 3).

Figure 4:
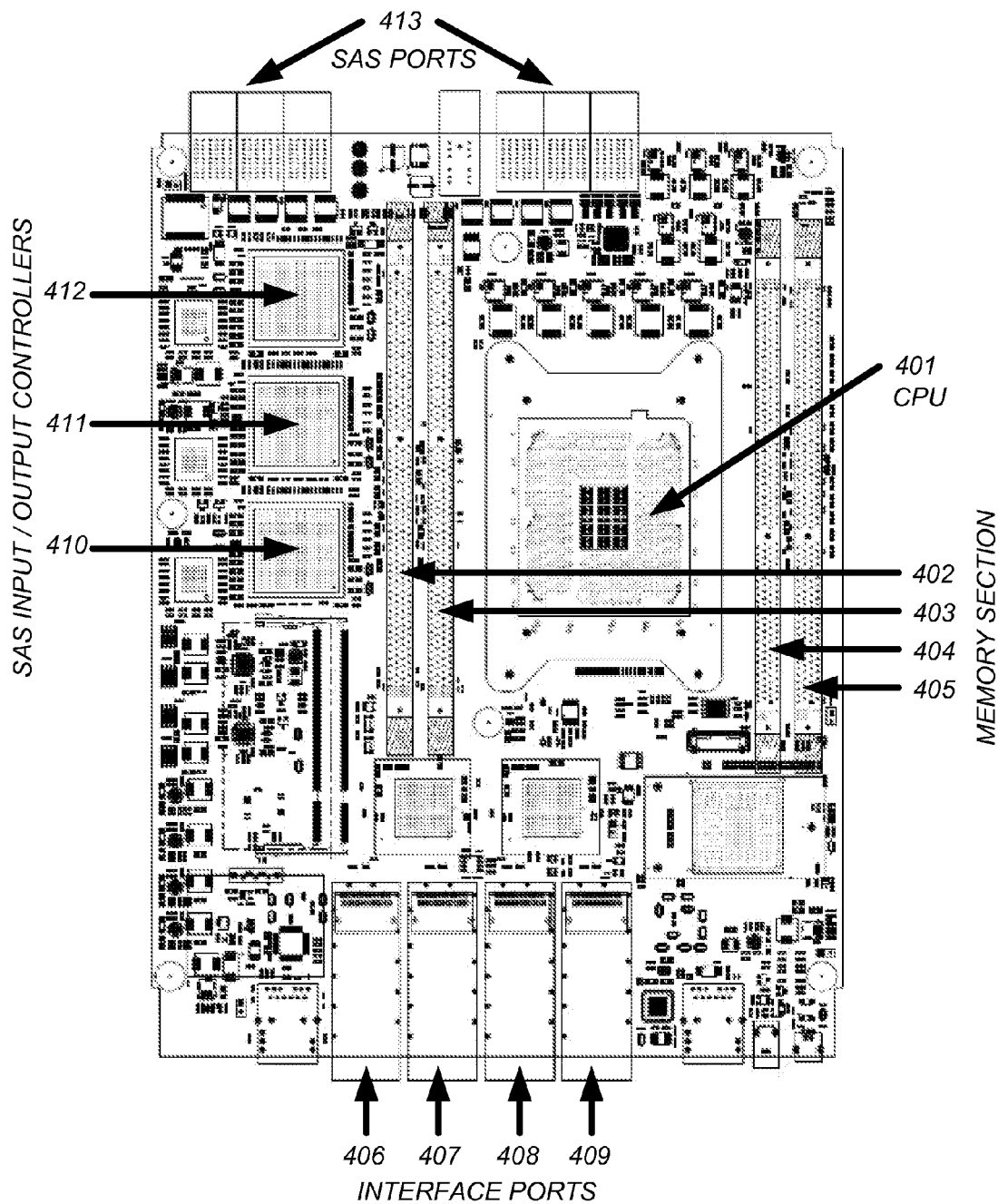
FIG. 4 depicts an exemplary circuit board of a network-attached storage array.

FIG. 4 illustrates exemplary circuit board 400. In one embodiment, circuit board 400 includes various components of NAS storage array 300 (FIG. 3). Circuit board 400 includes processor 401, memory sections 402-405, interface ports 406-409, I/O controllers 410-412, and SAS ports 413. Interface ports 406-409 may be network interfaces, such as Ethernet ports, which may be used to couple circuit board 400 to a network. Interface ports 406-409 may be communications interfaces of other design, such as Infiniband and/or fiber optics ports, which may be used to couple circuit board 400 to a host computer. SAS ports 413 may couple with a SAS midplane, which in turn may couple with SAS SSDs, thereby coupling circuit board 400 to downstream SSDs. For example, SAS ports 413 may allow 24 SAS SSDs to be connected to circuit board 400.

Processor 401 and/or I/O controllers 410-412 may store (e.g., tangibly embody) one or more computer programs for performing the above-described techniques. The computer programs may be written in a general-purpose programming language (e.g., C, assembly) or some specialized application-specific language (e.g., an FPGA programming language). Processor 401 and/or I/O controller 410-412 may also include application-specific integrated circuitry (ASIC) for performing the above-described techniques. The above-described techniques may store information into memory for subsequent use. Memory sections 402-405 may be coupled with Random Access Memory (e.g., DIMM) for storage of such information. Also, processor 401 and/or I/O controller 410-412 may have memory (e.g., cache memory, registers) for storing such information. Ports 413 are controlled by I/O controllers 410-412.

Figure 5:
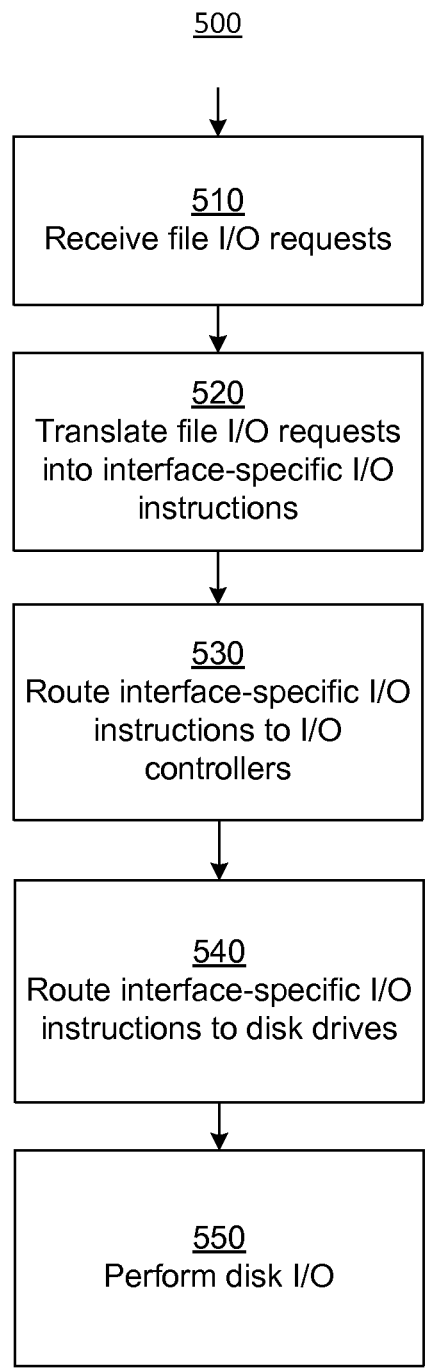
FIG. 5 depicts an exemplary process for storing data on a network-attached storage array.

FIG. 5 illustrates exemplary process 500 for storing data in a NAS storage array. In one embodiment, process 500 is performed by various components of NAS storage array 300 (FIG. 3). At block 510, incoming file I/O requests are received. The file I/O requests may be received via a network interface (e.g., Ethernet) or via communication interfaces of other design (e.g., fiber optic, Infiniband). The file I/O requests are passed to a processor. At block 520, the processor translates the file I/O requests into interface-specific I/O instructions. At block 530, the interface-specific I/O instructions are routed to one or more I/O controllers. The routing may be based on the location (i.e., particular disk drive(s)) of a requested file. Also, the routing may be based on a load-balancing algorithm that distributes interface-specific I/O instructions across multiple I/O controllers and/or multiple disk drives, as discussed above. At block 540, the interface-specific I/O instructions are routed to one or more disk drives for performing the necessary I/O operations. At block 550, the necessary I/O operations are performed by one or more disk drives.

Although a feature may appear to be described in connection with a particular embodiment, one skilled in the art would recognize that various features of the described embodiments may be combined. Moreover, aspects described in connection with an embodiment may stand alone.

What is claimed is:

1. A network data storage drive controller comprising:
a plurality of input/output (I/O) controllers each having (i) a plurality of drive-side I/O ports to be coupled respectively to a plurality of data storage drives, and (ii) a plurality of processor-side I/O ports interconnected respectively with the plurality of drive-side I/O ports to enable data transfer therebetween, wherein each of the drive-side I/O ports has a data throughput capability sufficient to accommodate a data bandwidth of the data storage drive to which it is coupled, and the plurality of processor-side I/O ports is equal in number and aggregate data bandwidth to the plurality of drive-side I/O ports such that each of the I/O controllers exhibits an aggregate data throughput sufficient to accommodate an aggregate data bandwidth of the plurality of data storage drives to which the I/O controller is to be coupled;
a central processing unit (CPU) having one or more network-side I/O ports and a plurality of sets of controller-side I/O ports, each set of controller-side I/O ports being coupled respectively to the processor-side I/O ports of a respective one of the I/O controllers and having a data throughput capability sufficient to meet the aggregate data throughput capability of the processor-side I/O ports of the respective one of the I/O controllers such that the aggregate data throughput capability of the plurality of sets of controller-side I/O ports of the CPU is sufficient to meet the aggregate data bandwidth of a totality of the data storage drives to which the plurality of I/O controllers are o be coupled; and
a network interface component having a network interface to receive and respond to file input/output (I/O) requests via a packet-transmission network, and a processor interface coupled to the one or more network-side I/O ports of the CPU, the processor interface and one or more network-side I/O ports having a data throughout capability sufficient to meet the aggregate data throughput capability of the plurality of sets of controller-side I/O ports of the CPU such that data throughput of the network interface component, CPU and plurality of I/O controllers is sufficient to meet the aggregate data bandwidth of the totality of the data storage drives.

2. The network data storage drive controller of claim 1, wherein the CPU receives the file I/O requests from the network interface component and converts each of the file I/O requests into a plurality of interface-specific I/O instructions to be routed via one or more of the I/O controllers to a respective set of one or more of the data storage drives.

3. The network data storage drive controller of claim 1, wherein at least one of the plurality of data storage drives is a solid-state data storage drive.

4. The network data storage drive controller of claim 1, wherein each of the drive-side I/O ports of the I/O controllers communicates according to the Serial Attached Small Computer Systems Interface (SAS) protocol and is capable of a data transfer speed of at least the maximum data transfer speed of the SAS protocol.

5. The network data storage drive controller of claim 1, wherein the data throughput capability of each of the drive-side I/O ports is at least six gigabits per second.

6. A method of operation within a network data storage drive controller, the method comprising:
receiving a file input/output (I/O) request within a network interface component via a network node and routing the file I/O request to a central processing unit (CPU);
converting the file I/O request to a plurality of interface-specific instructions within the CPU and routing the plurality of interface-specific instructions from the CPU to one or more data storage drives via one or more I/O controllers; and
transferring data between the one or more data storage drives and the network node via the I/O controllers, CPU and network interface component in response to the plurality of interface-specific instructions, wherein the network data storage drive controller includes a plurality of the I/O controllers having physical I/O ports sufficient to support a maximum number of the data storage drives, and wherein and a data throughput of the I/O controllers, CPU and network interface component is sufficient to meet the aggregate data bandwidth of the maximum number of the data storage drives.

7. The method of claim 6 wherein at least one of the data storage drives is a solid-state data storage drive.

8. The method of claim 6 wherein each of the I/O controllers communicates with a respective portion of the data storage drives according to the Serial Attached Small Computer Systems Interface (SAS) protocol and is capable of a data transfer speed of at least the maximum data transfer speed of the SAS protocol.

9. The method of claim 6 wherein the data throughput capability of each of the I/O controllers is at least six gigabits per second.

* * * * *